UNITED STATES PATENT OFFICE.

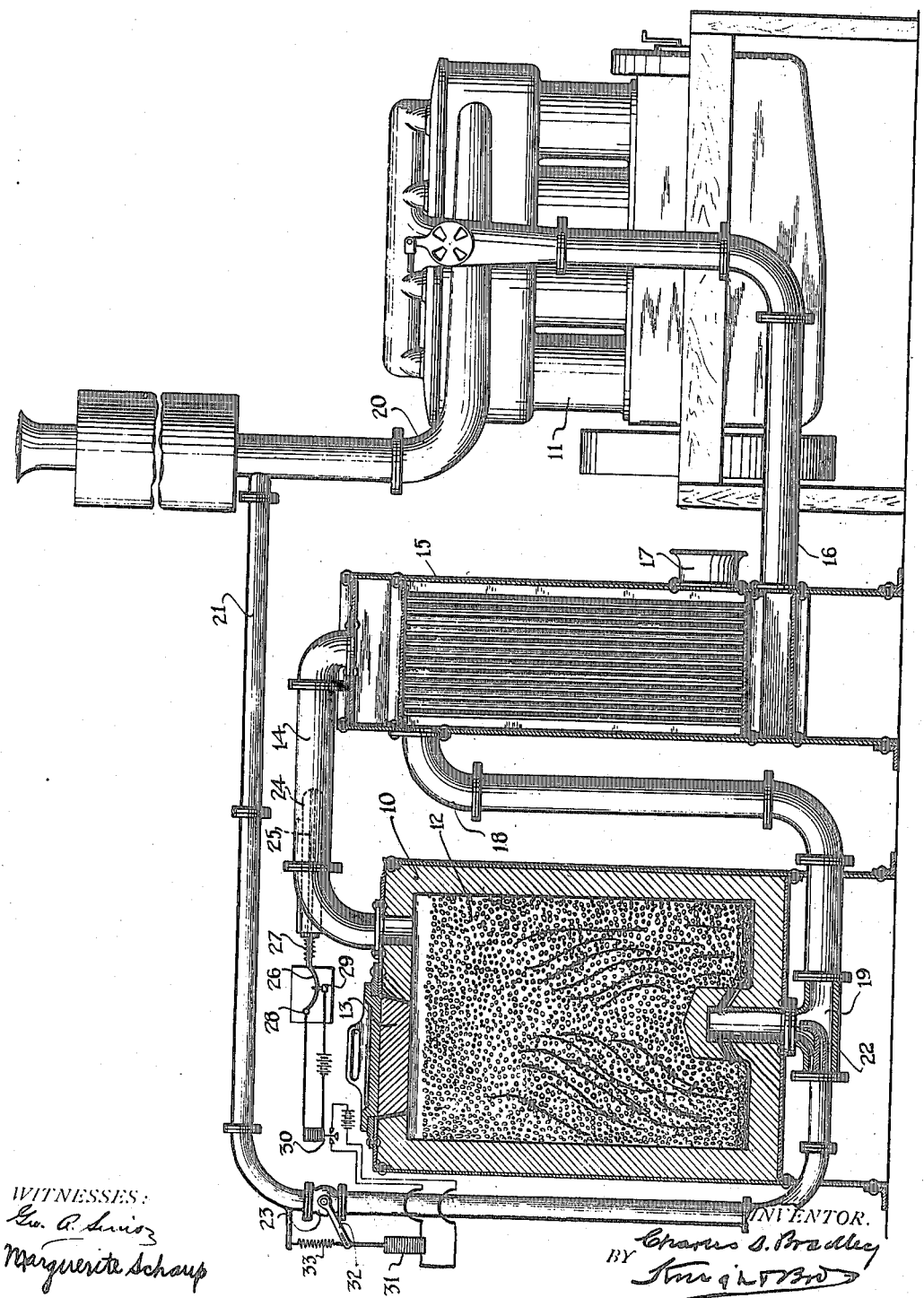

CHARLES S. BRADLEY, OF NEW YORK, N. Y.

PRODUCER-GAS-ENGINE SYSTEM.

1,212,894.  Specification of Letters Patent.  Patented Jan. 16, 1917.

Application filed February 3, 1914.  Serial No. 816,352.

*To all whom it may concern:*

Be it known that I, CHARLES S. BRADLEY, a citizen of the United States, residing in the borough of Manhattan, city, county, and State of New York, have invented certain new and useful Improvements in Producer-Gas-Engine Systems, of which the following is a full and clear specification.

My invention relates to producer-gas engine systems.

The objects of my invention are mainly to provide a more efficient and economical system of this type and to improve the operation thereof.

In the operation of the gas producer and engine, I return more or less of the burnt gases from the engine, for reduction in the producer, and control the proportion of spent gases to fresh air introduced into the producer, so as to regulate or maintain a normal temperature in the gas delivered by the producer. This control is preferably automatic and governed by the temperature of the producer gas.

It will be apparent that these principles may be embodied in various forms of apparatus, but for the purpose of illustrating the same I have herein shown an embodiment thereof for self propelled vehicles.

It will be understood that the invention is equally applicable to stationary installations and to moving objects generally.

Said drawing is a diagrammatic representation of an embodiment of the improved system and method, the producer and heat regenerator being shown in vertical section.

Referring more specifically to said drawing, 10 indicates the producer and 11 the engine. The producer 10 is supplied with pure carbon 12, by way of manhole 13 and the gas produced therein is delivered through pipe 14 into a heat regenerator 15, from which it passes through pipe 16 to the engine 11. Heat regenerator 15 receives atmospheric air at inlet 17 and delivers the same through pipe 18 by way of connection 19 into the producer 10. The exhaust pipe 20 from the engine 11 has communicating therewith a branch pipe 21. More or less of the burnt gases are delivered through nozzle 22, formed in connection 19, to the producer 10.

It will be apparent that the heated gases coming from producer 10 pass through the heat regenerator 15 in heat conductive relation to the fresh air which enters by way of inlet 17 and regenerate in the fresh air a portion of the contained heat, so that the producer gas enters the engine 11 at a suitable temperature. It will also be understood that the temperature of the gas, as it issues from the producer 10 will be higher when the supply of fresh air to the producer is greater, and that the temperature will be lowered upon increasing the proportion of burnt gases from the engine delivered into the producer. Therefore, by varying the proportions of the mixture of burnt gases and fresh air delivered to the producer, the temperature of the producer gas issuing therefrom can be regulated. In order to regulate or control the temperature automatically, I provide a valve 23 in the pipe 21 by which the passageway may be more or less closed, and this valve 23 is under the control of the temperature in pipe 14. To effect this operation I place a thermostatic device in pipe 14, which comprises an elongated cup 24, of a material which expands on being heated, and a rod 25 of a material which does not expand or has a relatively lower co-efficient of expansion, so as to produce a relative motion between the members 24 and 25 upon changes of temperature. The rod 25 operates a leaf spring contact 26 against the pressure of a spring 27 for closing the terminals 28, 29, of an electric circuit which operates relay 30 for energizing the solenoid 31. Solenoid 31 operates the valve lever 32 against the tension of spring 33. In this way as the temperature in pipe 14 increases the spring contact 26 is opened, so that spring 33 is freed of the opposition of solenoid 31 and opens wide the valve 23 to permit the maximum supply of burnt gases from the engine 11 to enter the producer 10. As the temperature in pipe 14 descreases the elongated cup 24 contracts and closes the terminals 28, 29, thus energizing solenoid 31 and partially closing the valve 23 to reduce the proportion of burnt gases delivered to the producer 10, thus tending to increase the temperature in the producer 10, by reason of the increased proportion of fresh air so introduced.

In starting the engine 11 is cranked to draw air through the producer 10 until the engine 11 is running under its own power. The valve 23 is held closed by the solenoid 31 until the normal running temperature is obtained in the pipe 14, whereupon the expansion of cup 24 opens the terminals 28, 29, and thus permits the spring 33 to open wider the valve 23 and admit more burnt gases from the engine 11, until the temperature virtually becomes stationary under the automatic control. The pure carbon 12 burns without ash and produces a pure gas, which requires no scrubbing.

I claim:

1. Apparatus of the character described, comprising in combination a producer, an engine, means for introducing fresh air into said producer, means for transferring heat from the producer gas to the fresh air and delivering the cooled producer gas to said engine, means for introducing burnt gas from said engine into said producer and automatic means for controlling the proportion of burnt gas to fresh air supplied to said producer.

2. Apparatus of the character described, comprising in combination a producer, an engine, means for introducing fresh air into said producer, means for transferring heat from the producer gas to the fresh air and delivering the cooled producer gas to said engine, means for introducing burnt gas from said engine into said producer and means for controlling the proportion of burnt gas to fresh air supplied to said producer by the temperature of the producer gas.

CHARLES S. BRADLEY.

Witnesses:
WM. A. COURTLAND.
OCTAVIUS KNIGHT.